US010359623B2

(12) United States Patent
Jiang et al.

(10) Patent No.: US 10,359,623 B2
(45) Date of Patent: Jul. 23, 2019

(54) OPTICAL PHASE SHIFTER

(71) Applicant: Wisconsin Alumni Research Foundation, Madison, WI (US)

(72) Inventors: Hongrui Jiang, Madison, WI (US); Alireza Ousati Ashtiani, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 6 days.

(21) Appl. No.: 15/381,824

(22) Filed: Dec. 16, 2016

(65) Prior Publication Data
US 2018/0172977 A1    Jun. 21, 2018

(51) Int. Cl.
G02B 26/00 (2006.01)
G02B 26/08 (2006.01)
G02F 1/29 (2006.01)

(52) U.S. Cl.
CPC ...... G02B 26/005 (2013.01); *G02B 2207/115* (2013.01); *G02B 2207/117* (2013.01)

(58) Field of Classification Search
CPC ........ G02B 2207/115; G02B 2207/117; G02B 26/005
USPC ......... 359/237, 265–267, 290–292, 295, 298
See application file for complete search history.

(56) References Cited

U.S. PATENT DOCUMENTS 4,964,701 A * 10/1990 Dorschner ............ G02F 1/1345
349/139

FOREIGN PATENT DOCUMENTS

WO    2008/095923    8/2008

OTHER PUBLICATIONS

A.O. Ashtiani et al., "Design and fabrication of an electrohydrodynamically actuated microlens with areal density modulated electrodes", Journal of Micromechanics and Microengineering, vol. 26, No. 1, p. 015004, Jan. 2016.
J.L. Hall et al., "Optial heterodyne saturation spectroscopy", Appl. Phys. Lett. vol. 39, No. 9, p. 680 (1981).
D. Huang et al., "Optical Coherence Tomography", Science, vol. 254, No. 5035, pp. 1178-1181, Nov. 1991.
V. Kumar et al., "Synthesis of hydrophilic to superhydrophobic SUB surfaces", J. Appl. Polym. Sci. vol. 132, No. 18, May 2015.
J. Lee et al., "Electrowetting and electrowetting-on-dielectric for microscale liquid handling", Sensors Actuators A Phys., vol. 95, No. 2, pp. 259-268, 2002.
S. Li et al., "Fabrication of micronozzles using low-temperature wafer-level bonding with SU-8", J. Micromech. Microeng., vol. 13, No. 03, pp. 732-738, 2003.

(Continued)

*Primary Examiner* — Brandi N Thomas
(74) *Attorney, Agent, or Firm* — Boyle Fredrickson, S.C.

(57) ABSTRACT

A optical phase shifter is provided for adjusting an optical phase of light propagating therethrough along an optical axis. The optical phase shifter includes first and second transparent slides defining a cavity therebetween. A sheet is received in the cavity and has first and second sides. The sheet includes a rigid inner portion alignable with the optical axis and is moveable along the optical axis between a first position and a second position. A tuning structure is operatively engageable with the rigid inner portion of the sheet to selectively move the rigid inner portion of the sheet along the optical axis so as to adjust the optical phase of light propagating through the optical phase shifter.

8 Claims, 4 Drawing Sheets

(56) References Cited

OTHER PUBLICATIONS

Z. Matjasec et al., "All-optical, thermo-optical path length modulation based on the vanadium-doped fibers", Opt. Express, vol. 21, No. 10, p. 11794, May 2013.
M. Moghimi et al., "High Speed Focus Control MEMS Mirror With Controlled Air Damping for Vital Microscopy", J. Mciroelectromech. Syst., vol. 22. No. 4, pp. 938-948, Aug. 2013.
H. Murata et al., "Optical Pulse Generation by Electrooptic-Modulation Method and Its Application to Integrated Ultrashort Pulse Generators", IEEE J. Sel. Top. Quantum Electron., vol. 6, No. 6, pp. 1325-1331, Nov. 2000.
H. Schreiber et al., "Phase Shifting Interferometry" in Optical Shop Testing, Hoboken, NJ; John Wiley & Sons, Inc., pp. 547-666.
A. Takei et al., "Angle-Tunable Liquid Wedge Prism Driven by Electrowetting", J. Microelectromech. Syst., vol. 16, No. 6, pp. 1537-1542, Dec. 2007.
E.L. Wooten et al., "Review of Lithium Niobate Modulators for Fiber-Optic Communications Systems", IEEE J. Sel. Top. Quantum Electron., vol. 6, No. 1, pp. 69-82, Jan. 2000.
F. Zernike, "Phase Contrast, A New Method or the Microscopic Observation of Transparent Objects", Physica, vol. 9, No. 7, pp. 686-698, Jul. 1942.

\* cited by examiner

OPTICAL PHASE SHIFTER

REFERENCE TO GOVERNMENT GRANT

This invention was made with government support under OD008678 awarded by the National Institutes of Health. The government has certain rights in the invention.

FIELD OF THE INVENTION

This invention relates generally to the adjustment of the optical path length of light passing through a media, and in particular, to a tunable optical phase shifter with a transmissive and wide aperture medium.

BACKGROUND AND SUMMARY OF THE INVENTION

When light propagates through a media, the optical path length of the light depends on the effective index of refraction of the media. As is known, the optical phase may be adjusted when light propagates through a media having a desired optical path length. Optical phase tuning is highly desired in various precision and imaging tools used for applications in industry and scientific research. Among various optical phase shifters (OPS), electro-optic modulators are frequently used, though mainly in communication systems.

Electro-optics are comprised of components, devices (e.g., lasers, light-emitting diodes (LEDs), waveguides, etc.) and systems which operate by the propagation and interaction of light with various tailored materials. Other phase shift methods employ fiber-optic based modulators, which suffer light loss, liquid crystal phase shifters, which can be slow, or mirror based systems, which require complex, precise mechanical controls.

With the advancement of imaging systems, such as optical coherence tomography, these imaging systems require optical path length modulation in one arm of an interferometer setup to produce noninvasive cross-sectional imaging in biological systems. In phase shifting interferometry (PSI), an OPS with a wide aperture and a linear medium is required. Other optical imaging systems, such as phase contrast microscopy, rely on a static OPS. Existing optical phase shift solutions each come with certain drawbacks. A tunable optical phase shifter with a transmissive and wide aperture medium is desirable for the simplification and miniaturization of optical systems.

Therefore, it is a primary object and feature of the present invention to provide a tunable optical phase shifter with a transmissive and wide aperture medium.

It is a further object and feature of the present invention to provide an optical phase shifter that simply and easily adjusts the optical phase of light propagating through a media having a desired optical path length.

It is a still further object and feature of the present invention to provide an optical phase shifter that is compatible with current imaging tools and is inexpensive to manufacture.

In accordance with the present invention, a tunable optical phase shifter is provided for adjusting an optical phase of light propagating therethrough along an optical axis. The tunable optical phase shifter includes a sheet having first and second sides and including a rigid outer portion interconnect to a rigid inner portion alignable with the optical axis by a complaint ring. The rigid inner portion is moveable along the optical axis between a first position and a second position. A fluid is provided on the second side of the sheet and is engageable with the rigid inner portion of the sheet for exerting a pressure thereon. A pressure generator is operable to selectively vary the pressure of the fluid against the rigid inner portion of the sheet to move the rigid inner portion of the sheet along the optical axis so as to adjust the optical phase of light propagates through the optical phase shifter.

The rigid inner portion of the sheet may be fabricated from a negative photoresist and the fluid may be non-conductive. The pressure generator also includes a conductive fluid extending about at least a portion of the non-conductive fluid. The pressure generator also includes a plurality of interdigitated electrodes positioned in spaced relation to the second side of the sheet. The plurality of interdigitated electrodes are operatively connectable to a voltage source. The voltage source supplies an adjustable voltage such that the pressure of the fluid against the rigid inner portion of the sheet varies in response to a magnitude of the voltage supplied to the plurality of interdigitated electrodes by the voltage source. At least one spacer may be positioned between the plurality of interdigitated electrodes and the second side of the sheet for spacing the sheet from the plurality of interdigitated electrodes.

In accordance with a further aspect of the present invention, an optical phase shifter is provided for adjusting an optical phase of light propagating therethrough along an optical axis. The optical phase shifter includes first and second transparent slides defining a cavity therebetween. A sheet is received in the cavity and has first and second sides. The sheet includes a rigid inner portion alignable with the optical axis and is moveable along the optical axis between a first position and a second position. A tuning structure is operatively engageable with the rigid inner portion of the sheet to selectively move the rigid inner portion of the sheet along the optical axis so as to adjust the optical phase of light propagating through the optical phase shifter.

The sheet includes a rigid outer portion interconnect to the rigid inner portion by a complaint ring. The compliant ring urges the rigid inner portion toward the first position. At least one spacer spaces the sheet from the second slide. The rigid inner portion of the sheet is fabricated from a negative photoresist. The tuning structure includes a first fluid on the second side of the sheet that is engageable with the rigid inner portion of the sheet for exerting a pressure thereon. The first fluid is non-conductive. The tuning structure also includes a second fluid extending about at least a portion of the first fluid. The second fluid is conductive. A plurality of interdigitated electrodes are spaced from the second side of the sheet. The plurality of interdigitated electrodes are operatively connectable to a voltage source. The voltage source supplies an adjustable voltage such that the pressure of the first fluid against the rigid inner portion of the sheet varies in response to a magnitude of the voltage supplied to the plurality of interdigitated electrodes by the voltage source.

In accordance with a still further aspect of the present invention, an optical phase shifter is provided for adjusting an optical phase of light propagating therethrough along an optical axis. The optical phase shifter includes first and second transparent slides defining a cavity therebetween. A sheet is received in the cavity and has first and second sides. The sheet includes a rigid inner portion alignable with the optical axis and moveable along the optical axis between a first position and a second position. A tuning structure is operatively engageable with the rigid inner portion of the sheet to selectively move the rigid inner portion of the sheet along the optical axis so as to adjust the optical phase of light propagating through the optical phase shifter. The tuning structure includes a first fluid on the second side of the sheet and engageable with the rigid inner portion of the sheet for exerting a pressure thereon. The first fluid is non-conductive. A second fluid extends about at least a portion of the first fluid. The second fluid is conductive. At least one electrode is spaced from the second side of the sheet and communicates with the conductive fluid. The electrode is operatively connectable to a voltage source. The voltage source supplies an adjustable voltage. The pressure of the first fluid against the rigid inner portion of the sheet varies in response to a magnitude of the voltage supplied to the electrode by the voltage source.

The sheet includes a rigid outer portion interconnect to the rigid inner portion by a complaint ring. The compliant ring urges the rigid inner portion toward the first position. At least one spacer spaces the sheet from the second slide. The rigid inner portion of the sheet is fabricated from a negative photoresist and the at least one electrode is one of a plurality of interdigitated electrodes.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
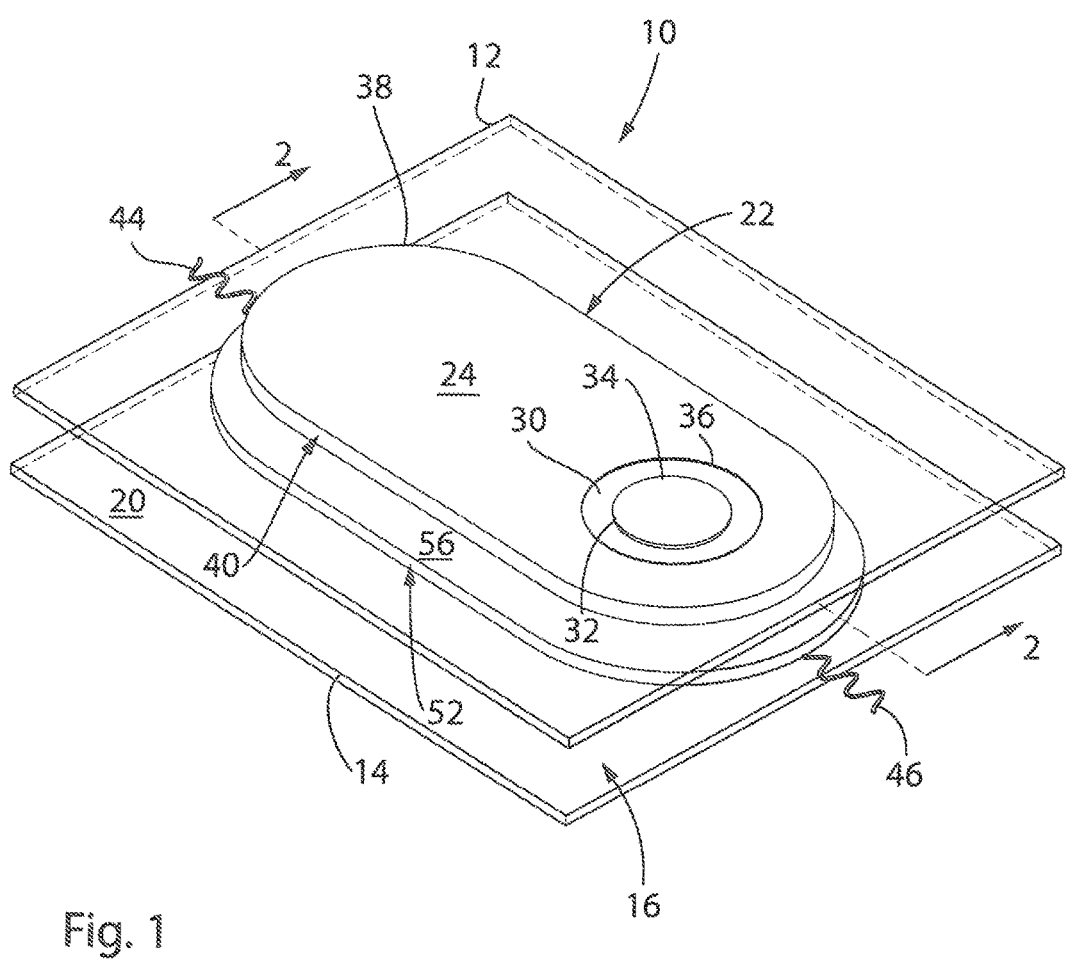
FIG. 1 is schematic, isometric view of a tunable optical phase shifter in accordance with the present invention.

Referring to FIGS. 1-5, an optical phase shifter in accordance with the present invention is generally designated by the reference numeral 10. Optical phase shifter 10 include first and second spaced slides 12 and 14, respectively, having inner surfaces 18 and 20, respectively, directed towards each other and defining cavity 16 therebetween. First and second slides 12 and 14, respectively, are fabricated from a transparent material, e.g. glass. However, first and second slides 12 and 14, respectively, may be fabricated from other materials without deviating from the scope of the present invention. The outer peripheries of first and second slides 12 and 14, respectively, are bonded to each other in any conventional manner so as to fluidically seal cavity 16 from the environment outside of optical phase shifter 10, for reasons hereinafter described. Alternatively, a three dimensional printed chamber may be placed between first and second slides 12 and 14, respectively, and glued to thereto to provide a sealed cavity.

Figure 2:
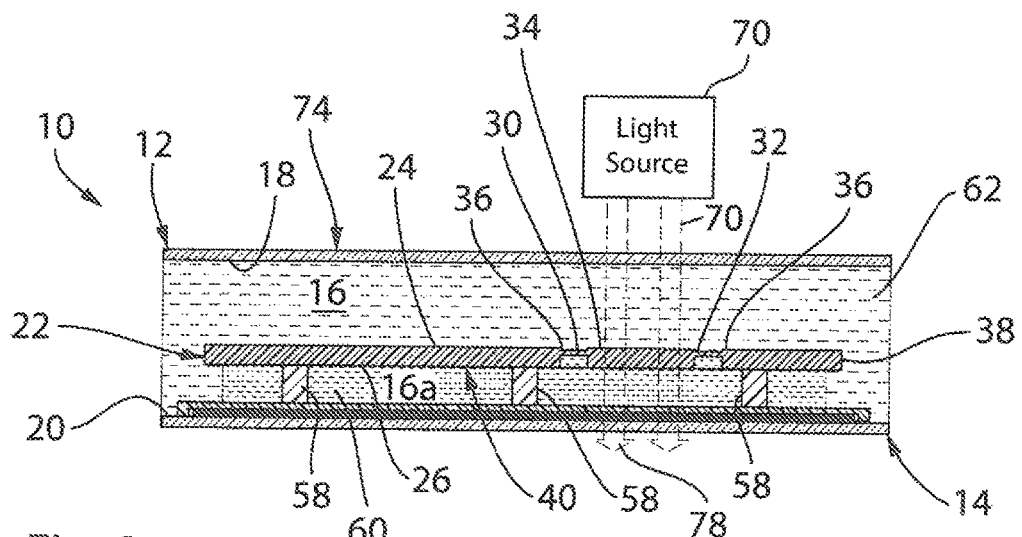
FIG. 2 is a cross sectional view of the optical phase shifter of the present invention in an initial state taken along line 2-2 of FIG. 1.
Figure 3:
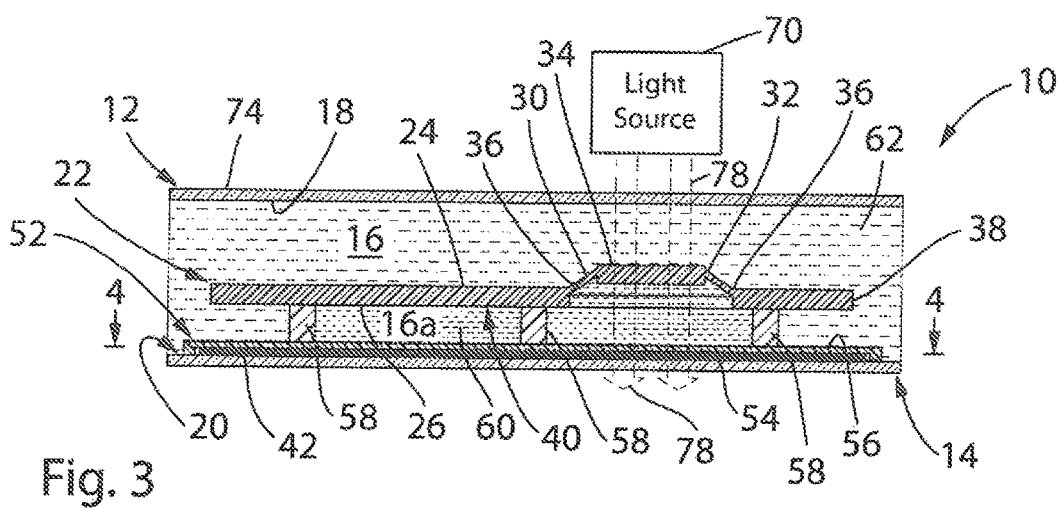
FIG. 3 is a cross sectional view of the optical phase shifter of the present invention, similar to FIG. 2, showing the optical phase shifter in a displaced state.
Figure 4:
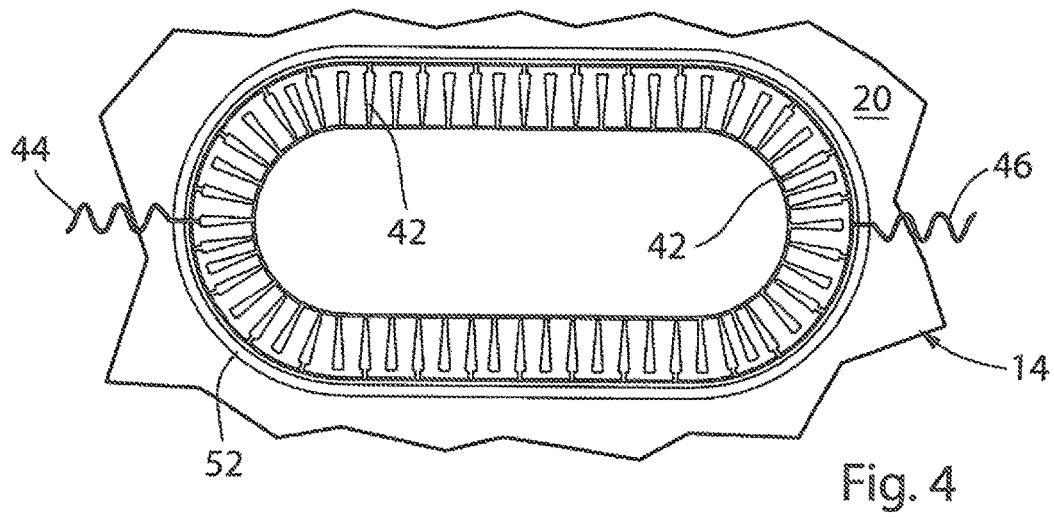
FIG. 4 is a cross sectional view of the optical phase shifter of the present invention taken along line 4-4 of FIG. 2.
Figure 5:
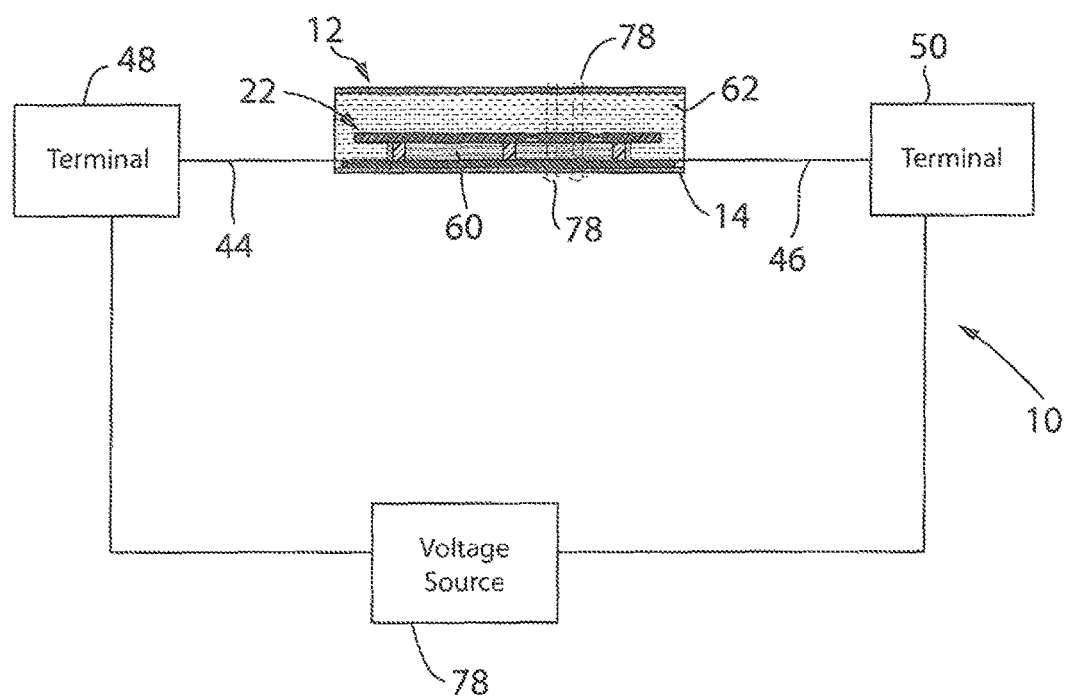
FIG. 5 is a schematic view of the optical phase shifter of the present invention interconnected to a voltage source.

As best seen in FIGS. 2-3, sheet or layer 22 is positioned between inner surfaces 18 and 20 of first and second slides 12 and 14, respectively, in cavity 16. It is contemplated for layer 22 and first and second slides 12 and 14, respectively, to lie in corresponding generally parallel planes. By way of example, layer 22 fabricated from is a high contrast, epoxy based photoresist such as SU-8. However, layer 22 may be fabricated from other materials without deviating from the scope of the present invention. Layer 22 includes an upper surface 24 spaced from and directed towards inner surface 18 of first slide 12 and a lower surface 26 spaced from and directed towards inner surface 20 of second slide 14.

Layer 22 further includes a reduced thickness portion, generally designated by the reference number 30. In the depicted embodiment, reduced thickness portion 30 is generally ring-shaped having an inner edge 32 defining a generally circular, optical section 34 of layer 22 and an outer edge 36. As hereinafter described, it is intended for reduced thickness portion 30 to allow optical section 34 of layer 22 to move axially along an optical axis in response to a hydraulic pressure thereon. Alternatively, reduced thickness portion 30 may be fabricated from a material with reduced young modulus compared to the rest of layer 22 to facilitate the displacement of optical section 34, as hereinafter described. Outer periphery 38 of layer 22 and outer edge 36 of reduced thickness portion 30 of layer 22 define a support portion 40 of layer 22 therebetween. For reasons hereinafter described, it is contemplated for optical section 34 of layer 22 and support portion 40 of layer 22 to be rigid to resist the curvature thereof. A plurality of interdigitated electrodes 42 are patterned on inner surface 20 of second slide 14, FIG. 4. Electrodes 42 are aligned with layer 22 and includes first and second lines 44 and 46, respectively, projecting laterally therefrom along inner surface 20 of second slide 14. Each line 44 and 46 extends outwardly of cavity 16 and terminates at a corresponding terminal 48 and 50, respectively, FIG. 5, which are selectively connectable to voltage source 78. Insulator 52 overlaps the outer periphery of plurality of interdigitated electrodes 42 and includes a lower surface 54 bonded to electrode 42 and an upper surface 56 directed towards lower surface 26 of layer 22. A plurality of spacers 58 extend between upper surface 56 of insulator 52 and support portion 40 of layer 22 so as to maintain layer 22 generally parallel to first and second slides 12 and 14, respectively.

Optical phase shifter 10 further includes first and second fluids or liquids 60 and 62, respectively, providing in cavity 16. First and second liquids 60 and 62, respectively are immiscible and may be considered incompressible. Furthermore, first and second liquids 60 and 62, respectively, may have closely matching densities, in order to increase shock, vibration and acceleration resistance of the optical phase shifter 10 and have different refractive indices. First liquid 60 is non-conductive and is provided in a lower portion 16a of cavity 16 between lower surface 26 of layer 22 and upper surface 56 of insulator 52. Second liquid 62 is conductive and is provided between upper surface 24 of layer 22 and inner surface 18 of first slide 12 and about outer periphery 64 of first liquid 60. It is noted by providing rigid portions of layer 22, namely, optical section 34 of layer 22 and support portion 40 of layer 22 between two immiscible liquids, namely, first and second liquids 60 and 62, respectively, curvature is prevented from forming at the optical interfaces. For reasons hereinafter described, second liquid 62 is drawn into lower portion 16a of cavity 16 between lower surface 26 of layer 22 and upper surface 56 of insulator 52 in response to the application of voltage to electrodes 42 via electrowetting. Alternatively, second liquid 62 may be a liquid with high dielectric constant which is capable of providing a dielectrophoretic force on first liquid 60, instead of electrowetting.

In operation, optical phase shifter 10 is provided in an initial state wherein the plurality of interdigitated electrodes 42 are electrically isolated from voltage source 78. Optical phase shifter and/or light source 70 are positioned such that light rays 72 generated by light source 70 are directed toward optical phase shifter 10 and aligned with optical section 34 of layer 22. It is intended for light rays 72 to travel along an optical axis having a path normal to outer surface 74 of first slide 12 so as to sequentially pass through first slide 12, second liquid 62, optical section 34 of layer 22, first liquid 60 and second slide 14.

In its initial state, FIG. 2, optical phase shifter 10 exhibits an optical path length (OPL) along the optical axis of:

$$OPL_1 = n_A d_A + n_B d_B \qquad \text{Equation (1)}$$

wherein: subscript "1" denotes the initial state of optical phase shifter 10; $n_A$ is a refractive index of second liquid 62, $n_B$ is the refractive index of first liquid 60, $d_A$ is the thickness of second liquid 62 through which light rays 72 travel; and $d_B$ is the thickness of first liquid 60 through which light rays 72 travel.

Once optical phase shifter 10 is properly positioned, the plurality of interdigitated electrodes 42 of optical phase shifter 10 may be electrically connected to variable voltage source 78 such that voltage source 78 provides a user selected, variable voltage to the plurality of interdigitated electrodes 42. In response to application of the user selected voltage to the plurality of interdigitated electrodes 42, second liquid 62 is drawn into lower portion 16a of cavity 16 between lower surface 26 of layer 22 via electrowetting or dielectrophoresis, FIG. 3. Since first and second liquids 60 and 62 may be considered incompressible, the drawing of second liquid 62 into lower portion 16a causes the pressure generated by first liquid 60 in lower portion 16a of cavity 16 on optical section 34 of layer 22 to increase. This increased hydraulic pressure of first liquid 60 in lower portion 16a of cavity 16 causes the displacement of optical section 34 of layer 22 along the optical axis against the resilient retaining force of reduced thickness portion 30 of layer 22. With optical section 34 of layer 22 displaced along the optical axis in response to the user selected voltage, optical phase shifter 10 may be designated as being in a displaced state, FIG. 3.

It can be appreciated that the volume of first liquid 60 drawn to lower portion 16a of cavity 16 is dependent on the magnitude of the user selected voltage provided to the plurality of interdigitated electrodes 42. Hence, by varying the magnitude of the user selected voltage provided to the plurality of interdigitated electrodes 42, the hydraulic pressure exerted by first liquid 60 on optical section 34 of layer 22 may be adjusted, and consequently, the magnitude of the displacement of optical section 34 of layer 22 along an axis coincident with the travel path of light rays 72 may be controlled.

The displacement of optical section 34 of layer 22 along the optical axis induces an optical path difference (OPD), and thus, a phase shift compared to the initial state. More specifically, in the displaced state, optical phase shifter 10 exhibits an optical path length (OPL) according to the expression:

$$OPL_2 = n_A d_{A1} + n_B d_{B2} \qquad \text{Equation (2)}$$

wherein: subscript "2" denotes the displaced state of optical phase shifter 10; $n_A$ is the refractive index of second liquid 62; $d_B$ is the refractive index of first liquid 60; $d_{A2}$ is the thickness of second liquid 62 through which light rays 72 travel; and $d_{B2}$ is the thickness of first liquid 60 through which light rays 72 travel.

As such, the optical path difference (OPD) may be calculated as the difference in the OPL between the initial state and the displaced state in accordance with the expression:

$$OPD_{1 \to 2} = (n_B - n_A) \Delta d \qquad \text{Equation (3)}$$

wherein: $n_A$ is the refractive index of second liquid 62; $n_B$ is the refractive index of first liquid 60; and $\Delta d$ is the distance optical section 34 of layer 22 of optical phase shifter 10 has been displaced.

In view of the foregoing, it is understood that the optical phase shift of light rays 72 traveling through optical phase shifter 10 may be calculated according to the expression:

$$OPS = 2\pi \cdot OPD_{1 \to 2}/\lambda \qquad \text{Equation (4)}$$

wherein: OPS is the optical phase shift of light rays 72 thought optical phase shifter 10; $OPD_{1 \to 2}$ is the difference in the OPL of light rays 72 with optical phase shifter 10 in the initial state and with the optical phase shifter 10 in the displaced state; and $\lambda$ is the wavelength of light rays 72 traveling through optical phase shifter 10.

In view of the foregoing, it can be appreciated that by selectively varying the displacement of optical section 34 of layer 22 along the optical axis by varying the magnitude of the voltage supplied to the plurality of interdigitated electrodes 42, a user may accurately tune/adjust the optical phase of the light rays 72 passing through optical phase shifter 10. While the thickness of optical section 34 of layer 22 of optical phase shifter 10 adds an extra OPL to optical phase shifter 10, it is noted that the thickness of optical section 34 of layer 22 remains constant during device operation. Hence, the extra OPL does not alter the calculation of the OPS. Similarly, first and second slides 12 and 14, respectively, add an extra OPL to optical phase shifter 10. However, it is noted that the thicknesses of first and second slides 12 and 14, respectively, remain constant during device operation, and hence, do not alter the calculation of the OPS.

Figure 6A:
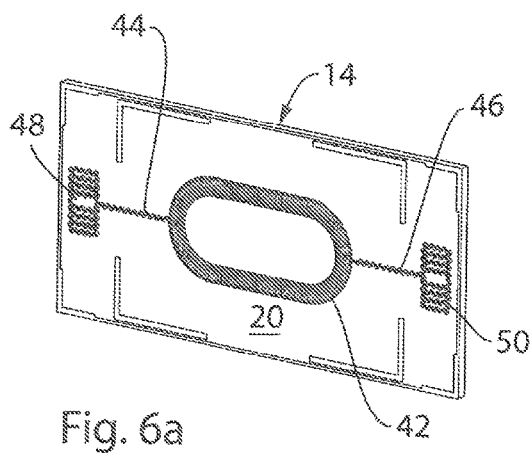
FIGS. 6A-6F are schematic views showing exemplary steps in the fabrication of the optical phase shifter of the present invention.
Figure 6B:
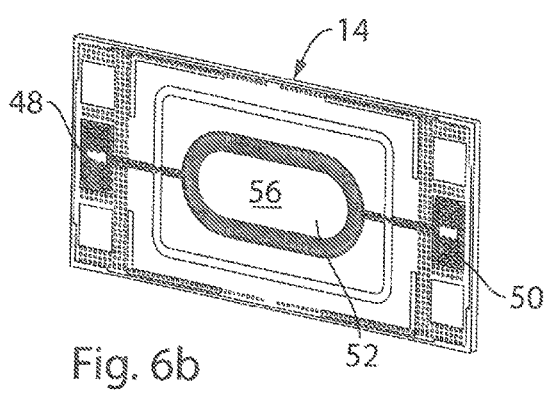
Figure 6C:
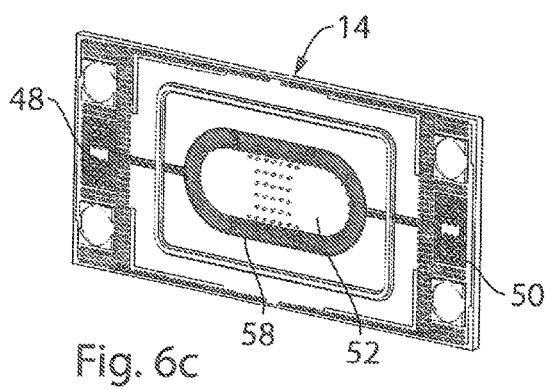

Referring to FIGS. 6A-6F, an exemplary process for fabricating the optical phase shifter 10 of the present invention is depicted. It can be appreciated that optical phase shifter 10 may be fabricated in other manners without deviating from the scope of the present invention. Referring to FIG. 6A, a 200 nanometer (nm) Tantalum layer is sputtered and patterned on inner surface 20 of second slide 14, e.g. a four (4) inch bottom glass wafer, to form the plurality of interdigitated electrodes 42. Insulator 52, e.g. a two (2) micrometer (μm) layer of SU8, is spin coated and patterned on the plurality of interdigitated electrodes 42, as shown in FIG. 6B. Thereafter, a two hundred (200) μm SU8 layer is patterned on upper surface 56 of insulator 52 to construct the plurality of spacers 58, FIG. 6c. The partially constructed optical phase shifter is then exposed to an oxygen plasma treatment to increase the surface energy of the SU8 to facilitate the subsequent bonding to the SU8 components, heretofore described.

Figure 6D:
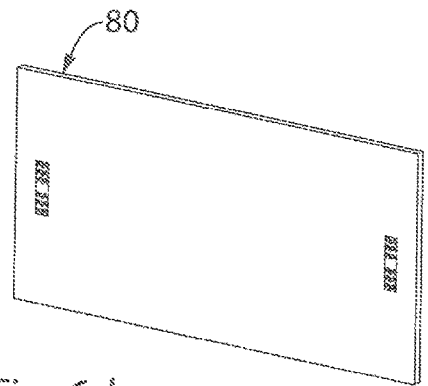
Figure 6E:
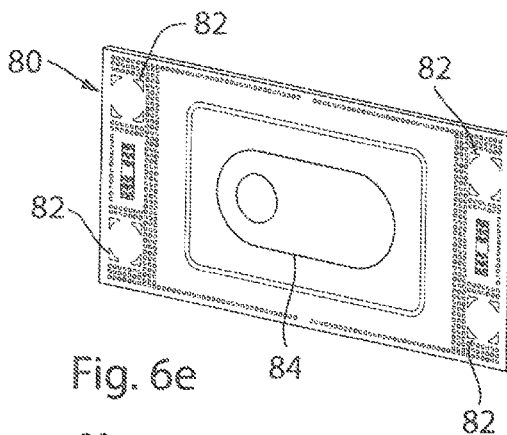
Figure 6F:
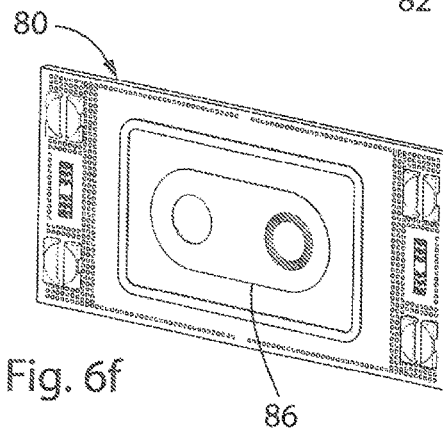

A wafer 80 having a sacrificial copper layer with a thickness of seven hundred fifty (750) nm deposited thereon is provided, FIG. 6d. The sacrificial copper layer is patterned to provide alignment marks 82 for successive steps hereinafter described. A two (2) μm SU8 layer is patterned on the copper layer, FIG. 6e. It is intended for the two (2) μm SU8 layer 84 to form reduced thickness portion 30 of layer 22. Thereafter, a first fifty (50) μm SU8 layer 86 is patterned on the two (2) μm SU8 layer to form optical section 34 of layer 22 and support portion 40 of layer 22, FIG. 6f. Finally, a second fifty (50) μm SU8 layer is patterned on the first fifty (50) μm SU8 layer to provide four (4) pairs of semicircular retention and alignment dimples thereon.

Wafer 80 is roughly aligned with second slide 14 and wafer 80 and second slide 14 are pressed together. The four (4) pairs of semicircular retention and alignment dimples patterned on first fifty (50) μm SU8 layer engage corresponding retention apertures provided in second slide 14 such the wafer and second slide 14 latch together. Thereafter, a selected pressure, e.g. 15 standard atmosphere units (atm), is applied to wafer 80 and second slide 14 and the latched wafer and second slide 14 combination is placed in a vacuum furnace. The latched wafer and second slide 14 combination is heated to a desired temperature, e.g. 130° C., for a selected period of time, e.g. 3 hours, to bond the latched wafer and second slide 14 combination together. Thereafter, the bonded wafer and second slide 14 combination cooled to room temperature and cut to size with a dicing saw. The bonded wafer and second slide 14 combination is deposited in a copper etchant solution for a selected time period so as to cause the sacrificial copper layer to release wafer 80. First and second lines 44 and 46, respectively, are electrically coupled to the plurality of interdigitated electrodes 42, for example, by a conductive silver epoxy glue. Second slide 14 is interconnected to first slide 12 in any conventional manner, e.g. with a marine grade epoxy glue, to fluidically seal cavity 16 in optical phase shifter 10.

Alternatively, as heretofore described, a three dimensional printed chamber may be positioned between first and second slides 12 and 14, respectively, and glued thereto to provide cavity 16. Second liquid 62, e.g., a silicone oil, may injected through an opening (not shown) into portion 16a of cavity 16 within optical phase shifter 10. The opening is then sealed with a fast curing epoxy. Subsequently, the rest of cavity 16 in optical phase shifter 10 is filled with first liquid 60, e.g. water.

Various modes of carrying out the invention are contemplated as being within the scope of the following claims particularly pointing out and distinctly claiming the subject matter, which is regarded as the invention.

We claim:

1. A tunable optical phase shifter for adjusting an optical phase of light propagating therethrough along an optical axis, comprising:
   a sheet having first and second sides and including:
      a rigid outer portion having an inner edge;
      a rigid inner portion having an outer edge and being moveable with respect to the rigid outer portion along the optical axis between a first position and a second position; and
      a compliant ring interconnecting the outer edge of the rigid inner portion to the inner edge of the rigid outer portion;
   a fluid on the second side of the sheet and engageable with the rigid inner portion of the sheet for exerting a pressure thereon; and
   a pressure generator operable to selectively vary the pressure of the fluid against the rigid inner portion of the sheet to move the rigid inner portion of the sheet along the optical axis so as to adjust the optical phase of light propagates through the optical phase shifter.

2. The tunable optical phase shifter of claim 1 wherein the rigid inner portion of the sheet is fabricated from a negative photoresist.

3. The tunable optical phase shifter of claim 1 wherein the fluid is a non-conductive fluid.

4. The tunable optical phase shifter claim 3 wherein the pressure generator includes a conductive fluid extending about at least a portion of the non-conductive fluid.

5. The tunable optical phase shifter of claim 1 wherein the pressure generator includes a plurality of interdigitated electrodes positioned in spaced relation to the second side of the sheet, the plurality of interdigitated electrodes operatively connectable to a voltage source.

6. The tunable optical phase shifter of claim 5 wherein the voltage source supplies an adjustable voltage and wherein the pressure of the fluid against the rigid inner portion of the sheet varies in response to a magnitude of the voltage supplied to the a plurality of interdigitated electrodes by the voltage source.

7. The tunable optical phase shifter of claim 5 further comprising at least one spacer between the plurality of interdigitated electrodes and the second side of the sheet for spacing the sheet from the plurality of interdigitated electrodes.

8. The tunable optical phase shifter of claim 1 wherein:
   the rigid outer portion lies in first plane;
   the optical axis is generally perpendicular to the first plane; and
   the rigid inner portion is generally planer and parallel to first plane in the first position.

* * * * *